United States Patent
Clark et al.

(10) Patent No.: US 11,335,177 B2
(45) Date of Patent: May 17, 2022

(54) DETECTION OF OBJECTS BASED ON CHANGE IN WIRELESS SIGNAL

(71) Applicant: HEWLETT-PACKARD DEVELOPMENT COMPANY, L.P., Spring, TX (US)

(72) Inventors: Alexander Wayne Clark, Houston, TX (US); Michael Bartha, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 80 days.

(21) Appl. No.: 16/481,823

(22) PCT Filed: Sep. 22, 2017

(86) PCT No.: PCT/US2017/053062
§ 371 (c)(1),
(2) Date: Jul. 29, 2019

(87) PCT Pub. No.: WO2019/059931
PCT Pub. Date: Mar. 28, 2019

(65) Prior Publication Data
US 2021/0287511 A1    Sep. 16, 2021

(51) Int. Cl.
*G08B 21/02* (2006.01)
*G02B 27/01* (2006.01)

(52) U.S. Cl.
CPC ......... *G08B 21/02* (2013.01); *G02B 27/0176* (2013.01); *G02B 2027/0167* (2013.01)

(58) Field of Classification Search
CPC ...... G08B 21/02; G08B 21/182; G08B 23/00; G02B 27/0176; G02B 2027/0167; H04N 13/344
See application file for complete search history.

(56) References Cited

U.S. PATENT DOCUMENTS

| | | | |
|---|---|---|---|
| 6,108,031 A | 8/2000 | King et al. | |
| 6,227,974 B1 | 5/2001 | Eilat et al. | |
| 9,674,664 B1 * | 6/2017 | Laursen | G08G 1/166 |

(Continued)

FOREIGN PATENT DOCUMENTS

| | | |
|---|---|---|
| CN | 103975268 | 8/2014 |
| CN | 105336098 | 2/2016 |

(Continued)

OTHER PUBLICATIONS

How to Avoid Real Objects While in a Virtual World, Jun. 12, 2015, < https://www.technologyreview.com/s/538336/how-to-avoidreal-objectswhile-in-avirtual-world/ >.

*Primary Examiner* — Maurice L. McDowell, Jr.
(74) *Attorney, Agent, or Firm* — HP Inc. Patent Department

(57) ABSTRACT

An example device includes a monitoring engine. The monitoring engine is to measure a characteristic of a wireless signal related to a path of the wireless signal. The wireless signal includes data from a remote source. The device includes an analysis engine to determine that an object is within a proximity threshold of a user based on the characteristic of the wireless signal. The device includes an indication engine to indicate to the user that the object is within the proximity threshold of the user.

12 Claims, 6 Drawing Sheets

(56) References Cited

U.S. PATENT DOCUMENTS

| | | | |
|---|---|---|---|
| 2006/0052112 A1* | 3/2006 | Baussi | G01S 5/0072 |
| | | | 455/456.1 |
| 2007/0247316 A1* | 10/2007 | Wildman | G06K 7/0008 |
| | | | 340/572.4 |
| 2009/0045958 A1* | 2/2009 | Spano | G08B 21/24 |
| | | | 340/572.2 |
| 2012/0092328 A1* | 4/2012 | Flaks | G06F 3/012 |
| | | | 345/419 |
| 2012/0129546 A1* | 5/2012 | Yang | H04W 64/00 |
| | | | 455/456.1 |
| 2013/0328928 A1 | 12/2013 | Yamagishi et al. | |
| 2016/0042567 A1* | 2/2016 | Shuster | G06T 19/20 |
| | | | 345/633 |
| 2016/0055680 A1 | 2/2016 | Kim et al. | |
| 2017/0053440 A1 | 2/2017 | Yoon et al. | |
| 2017/0076361 A1 | 3/2017 | Levesque et al. | |
| 2017/0123747 A1* | 5/2017 | Rochford | G06F 3/1423 |
| 2017/0287301 A1* | 10/2017 | Taylor | G01S 15/93 |
| 2017/0363706 A1* | 12/2017 | Ikonen | G01S 3/40 |
| 2019/0041973 A1* | 2/2019 | Maheshwari | G10L 19/018 |
| 2019/0304198 A1* | 10/2019 | Costa | G06F 3/0304 |
| 2020/0160378 A1* | 5/2020 | Komori | G06K 9/00885 |

FOREIGN PATENT DOCUMENTS

| | | | | |
|---|---|---|---|---|
| CN | 106468949 | | 3/2017 | |
| CN | 106530620 | | 3/2017 | |
| CN | 106873785 | | 6/2017 | |
| CN | 107024982 | | 8/2017 | |
| EP | 1612999 A1 * | | 1/2006 | ............ H04W 64/00 |
| EP | 3133468 A1 | | 2/2017 | |
| WO | WO-2015067982 | | 5/2015 | |

\* cited by examiner

DETECTION OF OBJECTS BASED ON CHANGE IN WIRELESS SIGNAL

BACKGROUND

A computer system may include a display. The display may create a virtual reality (VR) or augmented reality (AR) for the user. For example, the display may project images onto the eyes or retinas of the user, display images in front of the users eyes, or the like. An AR display may display images created by the computer system in combination with the user's surroundings. For example, the display may pass through light from the user's surrounding or display images of the user's surroundings. A VR display may display images created by the computer system without displaying the user's surroundings. For example, the images may be displayed on an opaque surface.

DETAILED DESCRIPTION

In an example, the computer system may include a headset to output information to a user wearing it. For example, the headset may produce images visible to the user, sounds audible to the user, or the like. The headset may be a VR headset, an AR headset, or the like. The headset may obstruct the vision of the user while the headset is being worn. For example, the headset may include a display covers an eye of the user while the headset is being used. There may be one display per eye or one display for both eyes. The headset may distract the user. For example, the headset may produce audio or video that distracts the user even if the user is able to view their environment.

The user may not be aware of objects around the user while the user is interacting with the headset. For example, the object may be a living organism (e.g., an animal, a person, a pet, a plant, or the like) that comes near the user or an inanimate object (e.g., furniture, appliances, electronics, etc.) that shifts position, falls over, is disrupted by a living organism, or the like. The object may present a threat to the user. For example, the object may be a tripping hazard, the object may intend to cause physical harm to the user, the user may wish to interact with the object, or the like. The user may be able to reduce the risk of harm if the headset is able to detect objects near the user that pose a threat and indicate those objects to the user.

The headset may include dedicated sensors to detect objects near the user. For example, the dedicated sensors may include passive infrared sensors, cameras, or the like. However, including the dedicated sensors may increase the cost of the headset and consume additional power. The dedicated sensors may be confused by movement of the user. Additionally, the dedicated sensors may have difficulty distinguishing people that intend to harm the user and people that do not. Detection of objects may be more reliable if sensors could better distinguish threats and were not confused by user movement. The user experience with the headset would be improved if the objects could be detected with minimal impact on the cost or power of the headset.

Figure 1:
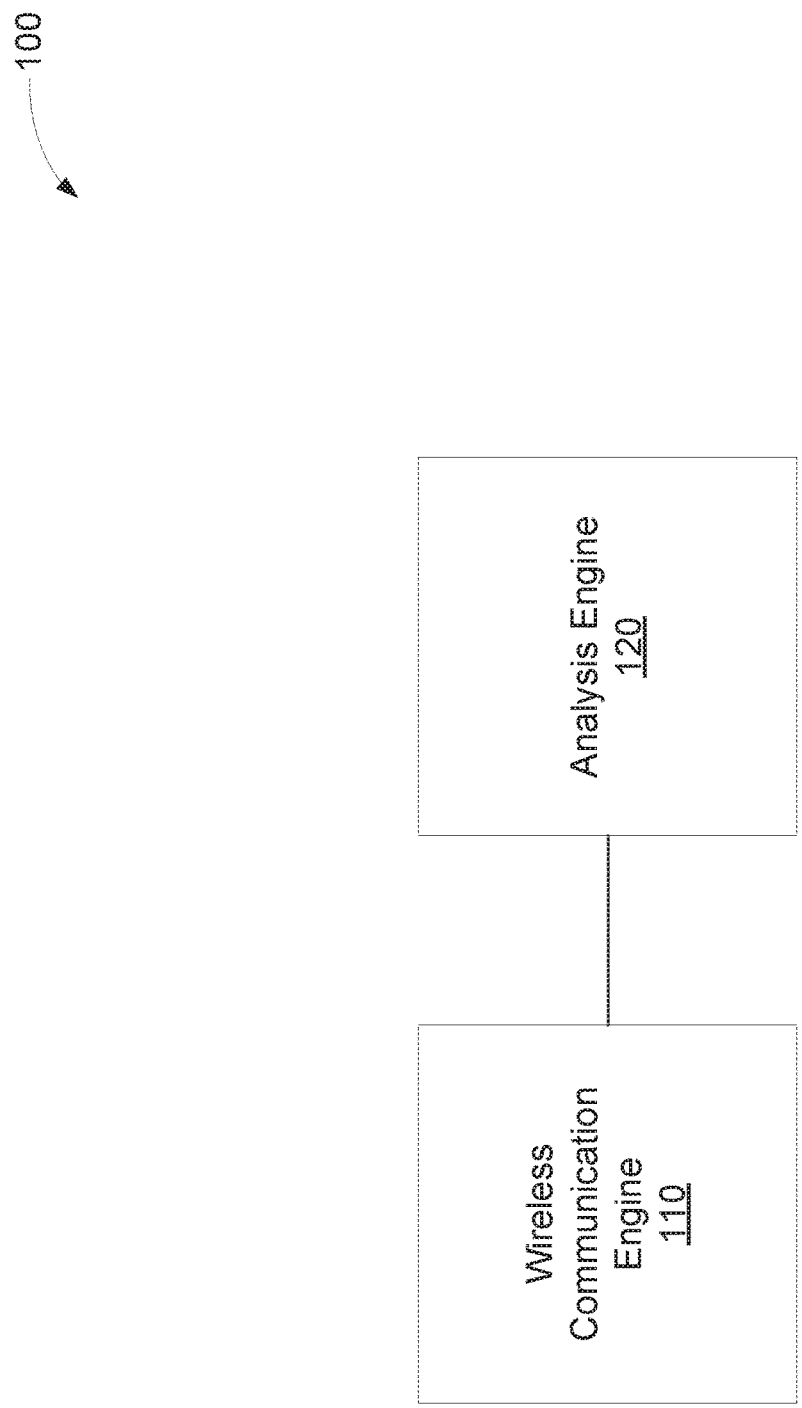
FIG. 1 is a block diagram of an example system to detect objects within a proximity threshold of a user.

FIG. 1 is a block diagram of an example system 100 to detect objects within a proximity threshold of a user. The system 100 may include a wireless communication engine 110. As used herein, the term "engine" refers to hardware (e.g., a processor, such as an integrated circuit or other circuitry, analog circuitry, etc.) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. The wireless communication engine 110 may receive a wireless signal that includes data from a remote source. The wireless signal may be intended for the system 100, may be a broadcast, may be intended for a recipient other than the system 100, or the like.

The system 100 may include an analysis engine 120. The analysis engine 120 may detect a change over time in the wireless signal related to a path of the wireless signal. The change over time may be a change in the wireless signal between a characteristic determined at a first point in time and the same characteristic determined at a second point in time. The change in the wireless signal may be related to the path of the wireless signal. For example, the change in the characteristic may result from a change in the path of the wireless signal.

The analysis engine 120 may determine whether an object is within a proximity threshold of a user based on the change in the wireless signal. For example, the analysis engine 120 may determine whether the change in the path of the wireless signal resulted from the object coming within the proximity threshold of the user. For example, the analysis engine 120 may determine whether the change or a value resulting from the change is more or less than a threshold. In an example, the system 100 includes a VR or AR headset, which includes the wireless communication engine 110 and the analysis engine 120.

Figure 2:
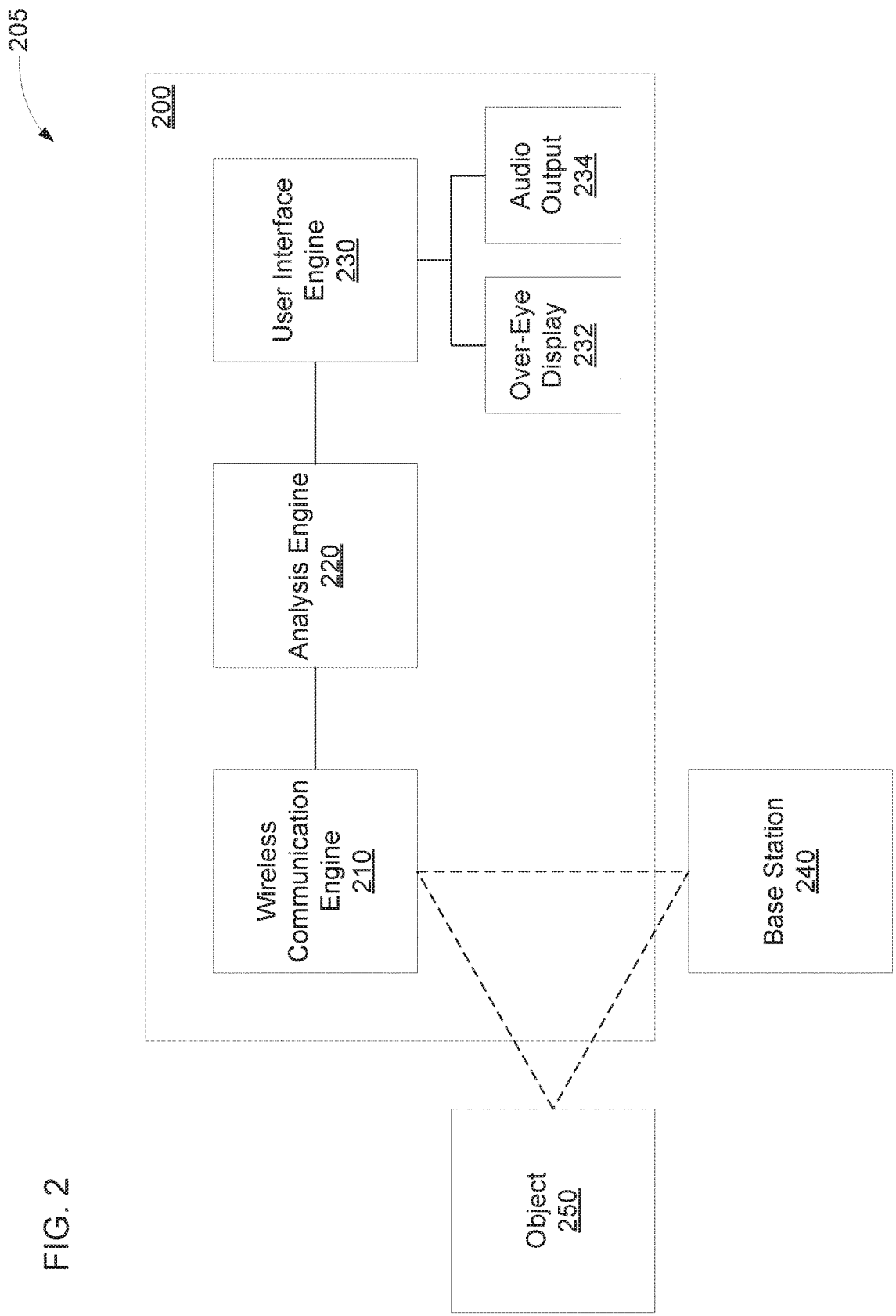
FIG. 2 is a block diagram of an environment including another example system to detect objects within a proximity threshold of a user.

FIG. 2 is a block diagram of an environment 205 including another example system 200 to detect objects within a proximity threshold of a user. The system 200 may include a wireless communication engine 210. The wireless communication engine 210 may receive a wireless signal that includes data from a remote source. In some examples, the wireless communication engine 210 may include an antenna. The wireless communication engine 210 may include hardware or software to down convert, demodulate, or decode the wireless signal. The wireless signal may be transmitted using electromagnetic radiation, sonic or ultrasonic energy, or the like. For example, the wireless signal may be a WiFi signal, a Bluetooth signal, a WiGig signal, a cellular network signal, or the like. The wireless signal may include data that can be extracted from the signal. In some examples, the wireless signal may not be a radar signal, a lidar signal, an ultrasonic ranging signal, or the like. The wireless signal may be transmitted for a reason other than detecting objects or determining their distance, such as to communicate the included data.

In an example, a base station 240 may transmit the wireless signal to the wireless communication engine 210. The system 200 may include the base station 240, or the base station 240 may be distinct from the system 200. The base station 240 may be located remotely from the system 200. The wireless signal may include data to be provided to the user, such as image data to be displayed to the user, audio data to be audibly played for the user, etc., communication overhead, or the like. In an example, an object 250 may transmit the wireless signal to the wireless communication engine 210. For example, the object 250 may be a living organism. The living organism may carry a device that transmits the wireless signal, such as a mobile device (e.g., a notebook, a tablet, a phone, etc.), a wearable (e.g., a watch, a radio frequency identification (RFID) tag, a dog tag, etc.), or the like. The living organism may be an animal, a person, a pet, a plant, or the like. In an example, the wireless signal may include messages broadcast by the carried device to detect other nearby devices, access points, or the like.

The system 200 may include an analysis engine 220 to detect a change over time in the wireless signal related to a path of the wireless signal. For example, the analysis engine 220 may determine that a characteristic of the wireless signal has changed between a first point in time and a second point in time. In some examples, the analysis engine 220 may detect the change based on a plurality of measurements of the characteristic over time. The wireless communication engine 210 may measure the characteristic of the wireless signal and communicate the measurement to the analysis engine 220. The analysis engine 220 may analyze the measurements received from the wireless communication engine 210 to detect the change in the wireless signal.

The characteristic or the change in the characteristic may relate to a path of the wireless signal. The characteristic may be a multipath of the signal, whether a strength of the signal indicates a line-of-sight path is obstructed, or the like. In an example, the wireless communication engine 210 may include an adaptive equalizer, and the wireless communication engine 210 may communicate parameters of the adaptive equalizer to the analysis engine 220. The multipath of the signal or the parameters of the adaptive equalizer may change when the object 250 comes within the proximity threshold of the system 200 or an object 250 within the proximity threshold of the system 200 changes its position. The multipath may be affected by objects not carrying devices that transmit wireless signals, so the analysis engine 220 may detect changes in the multipath due to movement of objects not carrying devices.

The wireless communication engine 210 may measure a signal strength and communicate the measured signal strength to the analysis engine 220. For example, the wireless communication engine 210 may communicate a received signal strength indicator to the analysis engine 220. The signal strength may change due to removal of an obstacle from the path of the wireless signal. Removal of the obstacle from the path may include a transmitter moving to a position where it has an unobstructed line of sight to the wireless communication engine 210.

The analysis engine 220 may determine whether the object 250 is within the proximity threshold of the user based on the change in the wireless signal. For example, the analysis engine 220 may determine whether the object 250 is in or about to enter the same room as the user, is within a predetermined distance of the user, has an unobstructed line of sight to the user, or the like. For example, the proximity threshold may include a fixed distance (e.g., a circle around the user), the boundaries of a room, or the like. The analysis engine 220 may determine whether a multipath characteristic or a change in the multipath characteristic indicates the object 250 is within the proximity threshold of the user. For example, the analysis engine 220 may detect a change in the multipath characteristic resulting from the object 250 creating an additional signal path. The analysis engine 220 may determine that the adaptive equalizer parameters correct for a new signal path caused by a new object 250. The analysis engine 220 may determine a location of the system 200 or may receive the location from a sensor. The analysis engine 220 may distinguish changes in the multipath resulting from movement of the system 200 from changes in the multipath resulting from the object 250 coming within the proximity threshold of the user.

The analysis engine 220 may determine whether a change in a signal strength characteristic indicates the object 250 is within the proximity threshold of the user. The removal of an obstacle between the transmitter and the wireless communication engine 210 may result in a rapid change in the signal strength. For example, a transmitter entering the doorway of a room containing the wireless communication engine 210 may no longer have a wall obstructing the path between the transmitter and the wireless communication engine 210. The analysis engine 220 may determine whether the change in the signal strength exceeds a threshold for measurements a predetermined time apart, whether the rate of change exceeds a threshold, or the like. The analysis engine 220 may determine whether the object 250 is within the proximity threshold of the user based on whether the threshold is exceeded.

The system 200 may include a user interface engine 230. For example, the user interface engine 230 may include or be communicatively coupled to an over-eye display 232 (e.g., an over-eye display for each eye), an audio output 234, or the like. The over-eye display 232 may include a display screen in front of an eye, a projector to project images on a retina, or the like. The user interface engine 230 may indicate to the user that the object 250 is within the proximity threshold of the user. For example, the over-eye display 232 may display a message indicating that the object 250 is within the proximity threshold of the user, display a distinctive symbol or color (e.g., a colored dot at a predetermined location, a full screen flashed one color for a brief period, etc.), or the like. The audio output 234 may play a distinctive sound, play a vocal indication the object 250 is within the proximity threshold of the user (e.g., a spoken message, etc.), or the like.

In some examples, the analysis engine 220 may identify the object 250, and the user interface engine 230 may indicate an identity of the object 250 to the user. The analysis engine 220 may identify the object 250 based on a signal transmitted by the object 250 (e.g., a device being carried by the object 250). For example, the object 250 may transmit a unique identifier, such as a media access control (MAC) address, a Bluetooth address, an internet protocol (IP) address, or the like. The analysis engine 220 may identify the object 250 based on the unique identifier. In some examples, the analysis engine 220 may identify the object 250 based on a plurality of unique identifiers (e.g., from a plurality of transmitters, from a plurality of devices, etc.).

The analysis engine 220 may identify the object 250 based on a size of the object 250. The analysis engine 220 may determine a size of the object 250 based on the characteristic of the signal. For example, a larger object may reflect more of the wireless signal than a smaller object. Accordingly, an adaptive equalizer may include a larger parameter for a larger object and a smaller parameter for a smaller object. If the analysis engine 220 does not know the identity of an object 250, the user interface engine 230 may request that the user identify the object 250. The user interface engine 230 may receive an indication of the identity of the object 250 from the user, and the analysis engine 220 may store the identity of the object 250.

The analysis engine 220 may determine whether to notify the user that the object 250 is within the proximity threshold of the user based on the identity of the object 250. For example, the user may have specified to the analysis engine 220 objects about whom the user should be notified or objects about whom the user should not be notified. In an example, the analysis engine 220 may notify the user if the object 250 is unidentified or if the object 250 has a particular identity. The analysis engine 220 may determine how to notify the user based on the identity of the object 250. For example, the user interface engine 230 may produce a discreet indication (e.g., a small visible indication, a unobtrusive sound, etc.) or a more noticeable indication (e.g., an indication that interrupts video or audio being played to the user, an indication that occupies much of a display, a harsh or loud sound, etc.) for particular objects.

The analysis engine 220 may determine whether to notify the user that the object 250 is within the proximity threshold of the user or how to notify the user based on whether the object 250 is a potential threat. As used herein, the term "threat" refers to any object with which the user may want to interact. For example, the threat may be a sibling, a manager, a friend, a pet, or the like. Based on a determination the object 250 is a potential threat, the user interface engine 230 may notify the user that the object 250 is within the proximity threshold of the user or that the object 250 is a potential threat. The analysis engine 220 may determine whether the object 250 is a potential threat based on the identity of the object 250, a proximity of the object 250, a time within the proximity threshold of the user, or the like. For example, the closer an object 250 is to the user or the longer the object 250 is within the proximity threshold of the user, the more of a threat the object 250 may be. The analysis engine 220 may determine whether to notify the user or how to notify the user based on a combination of factors. For example, a time or proximity threshold may vary depending on the identity, a time threshold may vary based on a proximity, or the like. In some examples, the time threshold may be zero (e.g., the user may be notified immediately) for particular identities or proximities but not for others. The user may explicitly specify the thresholds, or the analysis engine 220 may learn the thresholds to apply. For example, the analysis engine 220 may detect how the user reacts or how quickly the user reacts when informed of objects with particular identities or at particular proximities. The analysis engine 220 may detect whether the user removes a headset, pauses or quits an application, or the like.

The analysis engine 220 may determine a location of the object 250, and the user interface engine 230 may indicate the location of the object 250 to the user. The analysis engine 220 may determine a distance of the object 250 based on a signal strength of a wireless signal from the device carried by the object 250, based on a multipath characteristic of the wireless signal (e.g., a delay between receipt of the wireless signal over a line-of-sight path and a path reflecting off the object), or the like. The analysis engine 220 may determine the direction of the object (e.g., an azimuth of the object) based on detection of the wireless signal by a plurality of antennas (e.g., detection of the wireless signal from the device, the wireless signal traveling over the path reflecting off the object, etc.), based on the multipath characteristic (e.g., a delay of a signal reflecting off the object and another object with a known or predicted location), or the like. The location of another object, such as a wall, may be known based on boundary settings of a VR application, predicted based on multipath, or the like.

The wireless communication engine 210 may be communicatively coupled to the base station 240. The base station 240 may measure a characteristic of a wireless signal. For example, the base station 240 may measure a characteristic of the wireless signal transmitted by a device carried by the object 250, a characteristic of a wireless signal transmitted by the wireless communication engine 210, or the like. The characteristic may be a characteristic of the wireless signal related to a path of the wireless signal. The base station 240 may transmit the measurement of the characteristic to the wireless communication engine 210.

The analysis engine 220 may determine whether the object 250 is within the proximity threshold of the user based on the measurement of the wireless signal by the base station 240 (e.g., a change in the measurement of the wireless signal over time). For example, the analysis engine 220 may determine a location of the object relative to the user based on the measurement of the characteristic of the wireless signal by the base station 240. The analysis engine 220 may consider the characteristic of the wireless signal received by the base station 240 in combination with the characteristic of the wireless signal received by the wireless communication engine 210. The wireless communication engine 210 and the base station 240 may measure the same characteristic or different characteristics. Using measurements from multiple reception sites rather than a single site may improve accuracy or precision in determining whether the object 250 is within the proximity threshold of the user, in determining the location of the object, or the like. In an example, the system 200 includes a VR or AR headset, which includes the wireless communication engine 210, the analysis engine 220, and the user interface engine 230.

Figure 3:
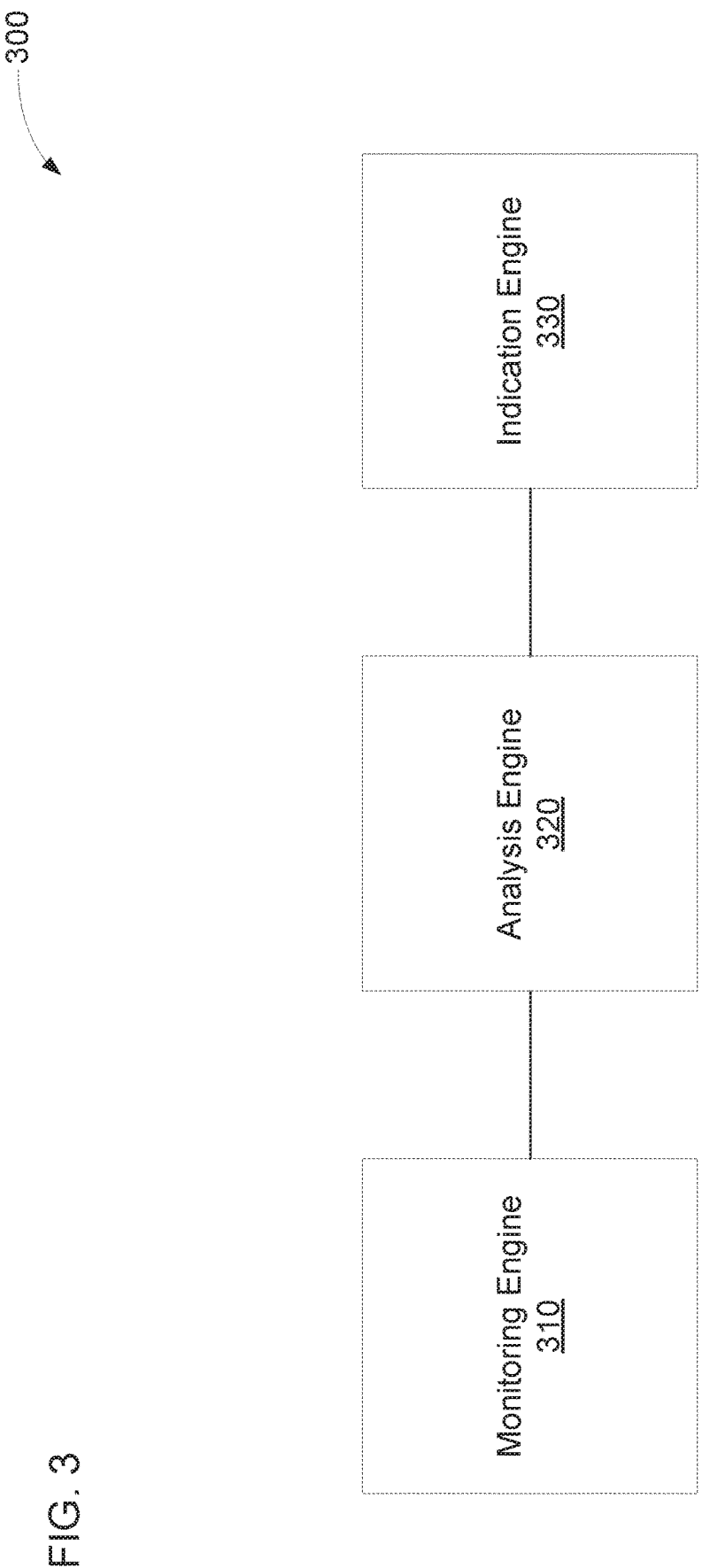
FIG. 3 is a block diagram of an example device to detect objects within a proximity threshold of a user.

FIG. 3 is a block diagram of an example device 300 to detect objects within a proximity threshold of a user. The device 300 may include a monitoring engine 310. The monitoring engine 310 may measure a characteristic of a wireless signal related to a path of the wireless signal. The wireless signal may include data from a remote source. The data may be extracted from the wireless signal by down-converting the wireless signal, demodulating the wireless signal, decoding the wireless signal, or the like. The monitoring engine 310 may be included in a communication pipeline (e.g., a pipeline to downconvert, demodulate, decode, etc.), the monitoring engine 310 may be distinct from the communication pipeline, or the device 300 may not include a communication pipeline.

The device 300 may include an analysis engine 320. The analysis engine 320 may determine that an object is within a proximity threshold of a user based on the characteristic of the wireless signal. For example, the analysis engine 320 may determine that a change in the characteristic indicates that the object is within the proximity threshold of the user, or the analysis engine 320 may determine that the object is within the proximity threshold of the user based on the value of the characteristic without considering the change in the characteristic. The analysis engine 320 may determine that the object is within the proximity threshold of the user by determining that the object is within the proximity threshold of the device 300.

The device 300 may include an indication engine 330. The indication engine 330 may indicate to the user that the object is within the proximity threshold of the user. For example, the indication engine 330 may produce a visual indication, an audible indication, a haptic indication, or the like. The indication engine 330 may provide the indication using an interface that provides information other than the indication that the object is within the proximity threshold of the user, using a dedicated interface to provide the indication, or the like. In some examples, the device 300 includes a VR or AR headset, which includes the monitoring engine 310, the analysis engine 320, and the indication engine 330.

Figure 4:
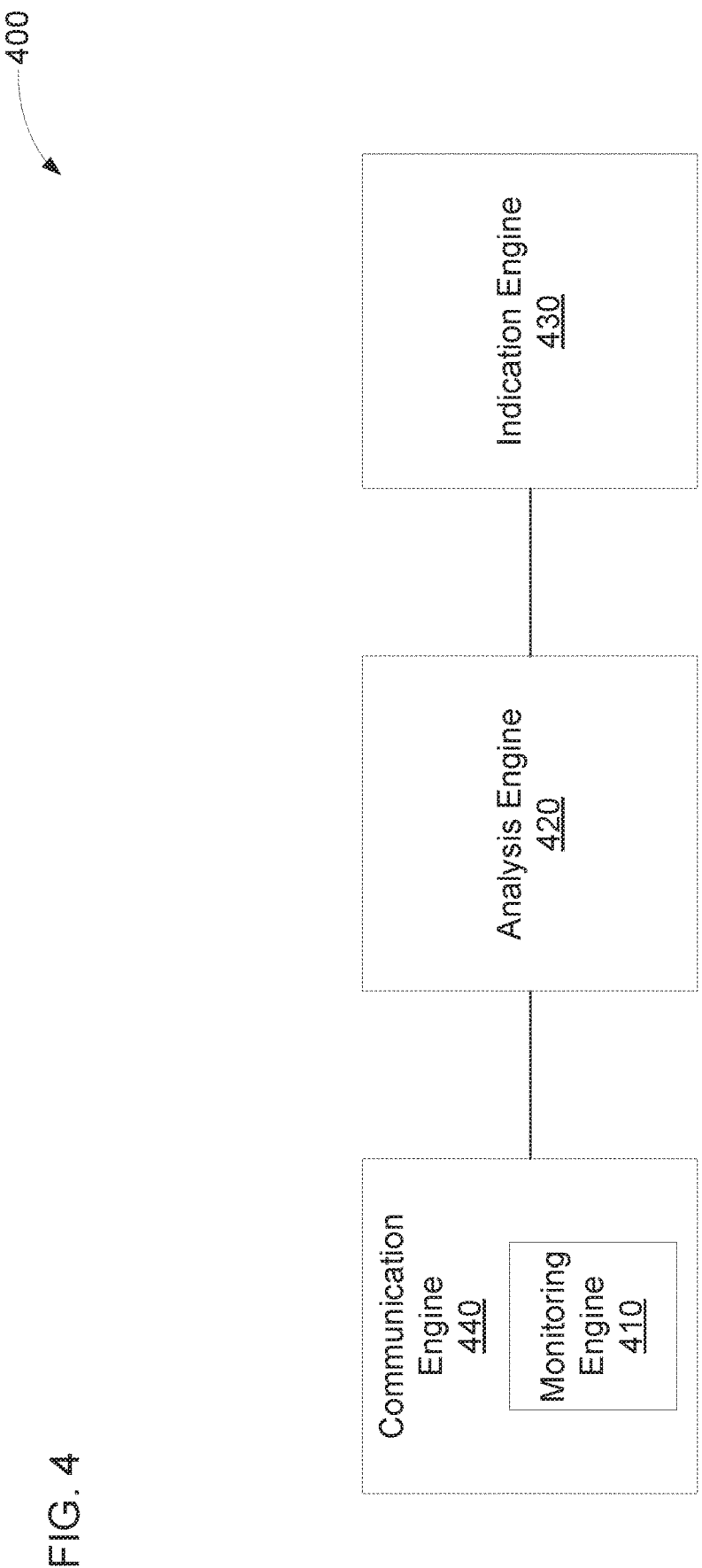
FIG. 4 is a block diagram of another example device to detect objects within a proximity threshold of a user.

FIG. 4 is a block diagram of another example device 400 to detect objects within a proximity threshold of a user. The device 400 may include a monitoring engine 410. The monitoring engine 410 may measure a characteristic of a wireless signal related to a path of the wireless signal. For example, the characteristic of the wireless signal may include a multipath characteristic of the wireless signal, whether a signal strength of the wireless signal indicates a line-of-sight path is obstructed, or the like. The monitoring engine 410 may include an adaptive equalizer, e.g., to measure multipath, an engine to measure signal strength (e.g., a signal strength at baseband or the like), or the like. A communication engine 440 may include the monitoring engine 410, or the monitoring engine 410 may be distinct from the communication engine 440. The monitoring engine 410 and the communication engine 440 may share an antenna or use separate antennas.

The wireless signal may include data from a remote source. For example, the remote source may be a base station, a mobile device, or the like. The data may include data intended for the device 400, data broadcast to all listeners, data intended for a different device, or the like. In an example, the data may not include a signal that includes a unique or pseudo-random pattern but does not otherwise include intelligible information. The wireless signal may be downconverted, demodulated, decoded, etc. to extract the data. The data may include data to be provided to the user, such as image data to be displayed to the user, audio data to be audibly played for the user, etc., communication overhead, or the like.

The device 400 may include an analysis engine 420. The analysis engine 420 may determine that an object is within a proximity threshold of a user based on the characteristic of the wireless signal. For example, the analysis engine 420 may determine that the object is within the proximity threshold of the user based on detecting a new path for the wireless signal, detecting a path change from the object coming within the proximity threshold of the user, or the like. The analysis engine 420 may determine that the object is within the proximity threshold of the user based on detecting a change in the signal strength indicative of the transmitter no longer being obstructed by an obstacle (e.g., because an object carrying the transmitter has entered or is about to enter a room).

The device 400 may include an indication engine 430 to indicate to the user that the object is within the proximity threshold of the user. For example, the indication engine 430 may produce a visible, audible, or haptic indication representing that the object is within the proximity threshold of the user, may produce visible text or audible speech explicitly stating the object is within the proximity threshold of the user, or the like. The indication engine 430 may include displays (e.g., VR or AR headset displays or projectors or the like), speakers (e.g., VR or AR headset speakers, headphones, or the like), haptic motors, or the like. The indication engine 430 may indicate additional information about the object, such as a location, an identity, a time within the proximity threshold of the user, or the like.

The analysis engine 420 may determine that the object is a potential threat. The indication engine 430 may indicate that the object is within the proximity threshold of the user based on the determination that the object is a potential threat. For example, the indication engine 430 may not indicate that the object is within the proximity threshold of the user if the analysis engine 420 determines that the object is not a potential threat. The user may not want a current activity disrupted if the object is not a potential threat. The indication engine 430 may also, or instead, determine how to indicate that the object is within the proximity threshold of the user based on whether the object is a potential threat. For example, the indication engine 430 may provide a more noticeable or intrusive indication if the analysis engine 420 determines that the object is a potential threat.

The analysis engine 420 may determine that the object is the potential threat based on a criterion selected from the group consisting of a proximity of the object, an identity of the object, and a time within the proximity threshold of the user. The analysis engine 420 may determine that the object is a potential threat based on the object being closer than a threshold distance, approaching faster than a threshold speed, a combination of distance and speed, or the like. The analysis engine 420 may apply different thresholds depending on the activity in which the user is engaged (e.g., which applications are running on the device 400 or a base station, which application has focus, etc.). The analysis engine 420 may determine that the object is a potential threat based on the object remaining within the proximity threshold of the user for more than a threshold time. The threshold time may depend on the distance, speed, identity, or the like. The analysis engine 420 may determine that the object is a potential threat immediately for a particular distance, speed, identity, or the like.

The analysis engine 420 may determine that the object is a potential threat based on the identity of the object. The analysis engine 420 may identify the object based on a strength of wireless signals reflecting off the object, unique identifiers transmitted by a device carried by the object, or the like. In an example, the indication engine 430 may request that the user identify an object, for example, if the object is unknown. The indication engine 430 may request that the user indicate whether the object is a threat. The user may specify distance, speed, time, etc. thresholds for the identity. The analysis engine 420 may learn which identities are potential threats based on how the user reacts to different objects. For example, the indication engine 430 may indicate the identity of the object to the user, and the analysis engine 420 may determine whether the user reacts to the object (e.g., suspends or closes an application, removes the device, etc.). The analysis engine 420 may learn the distance, speed, time, etc. thresholds at which the user reacts to the object.

The device 400 may include the communication engine 440. The communication engine 440 may be communicatively coupled to a base station remotely located from the device 400. The analysis engine 420 may determine a location of the object relative to the user based on the characteristic of the wireless signal and a measurement of a wireless signal received by the base station. The wireless signal received by the base station may be a wireless signal transmitted by the communication engine 440, a wireless signal transmitted by a device carried by the object, the same wireless signal measured by the monitoring engine 410, or the like. The analysis engine 420 may determine the location of the object based on the distance of the object from the device 400 and the distance of the object from the base station (e.g., as determined based on a multipath characteristic, a signal strength, etc.). The analysis engine 420 may determine the location of the object based on whether there is an obstacle between the object and the base station, such as the user, a wall, etc. In some examples, the base station may include multiple antennas, and the base station or the analysis engine 420 may determine a direction of the object (e.g., the azimuth of the object) relative to the base station. The analysis engine 420 may also determine the direction of the object (e.g., azimuth of the object) relative to the device 400. The analysis engine 420 may determine the location of the object based on the direction or distance of the object from the base station or device 400. In some examples, the device 400 includes a VR or AR headset, which includes the monitoring engine 410, the analysis engine 420, the indication engine 430, and the communication engine 440.

Figure 5:
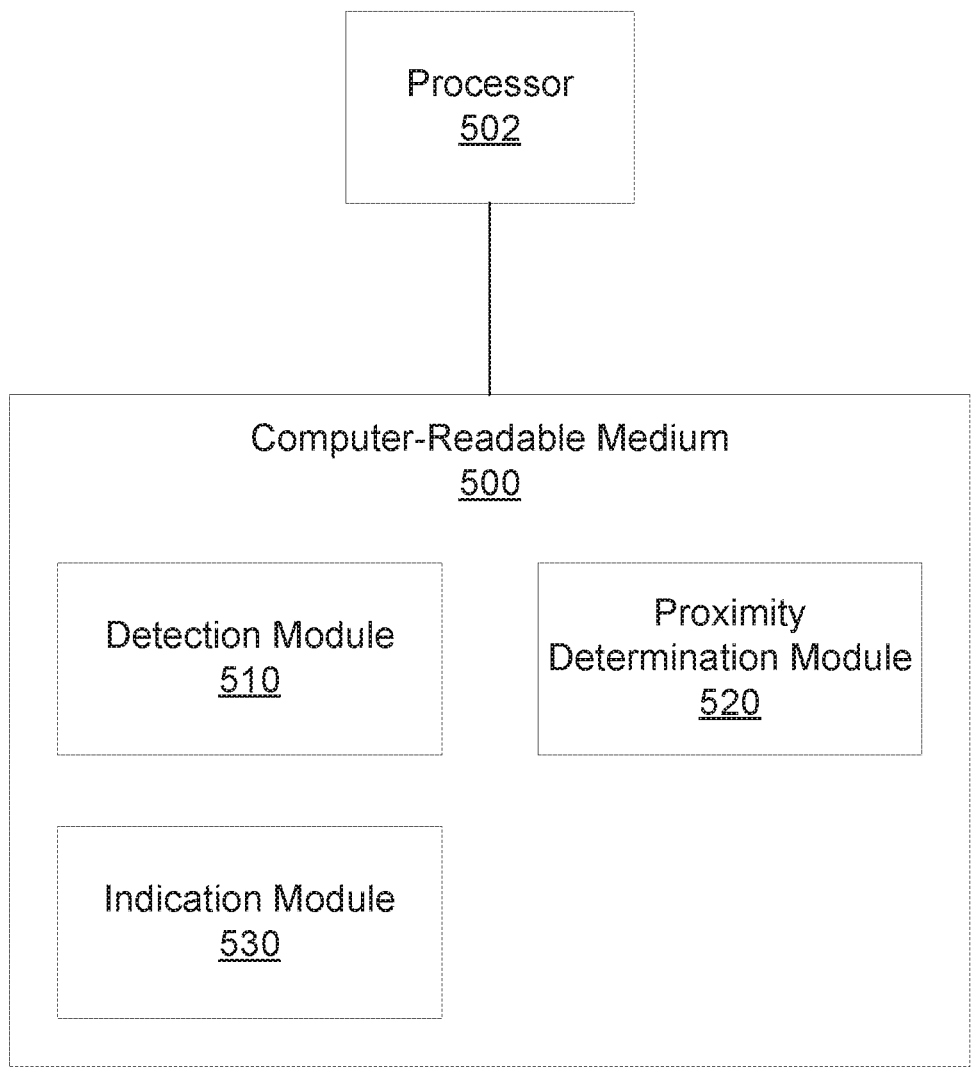
FIG. 5 is a block diagram of an example computer-readable medium including instructions that cause a processor to detect objects within a proximity threshold of a user.

FIG. 5 is a block diagram of an example computer-readable medium 500 including instructions that, when executed by a processor 502, cause the processor 502 to detect objects within a proximity threshold of a user. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a detection module 510. As used herein, a "module" (in some examples referred to as a "software module") is a set of instructions that when executed or interpreted by a processor or stored at a processor-readable medium realizes a component or performs a method. The detection module 510, when executed by the processor 502, may cause the processor 502 to detect a change over time in a wireless signal related to a path of the wireless signal. For example, the detection module 510 may cause the processor 502 to measure a characteristic of the wireless signal that is related to the path of the wireless signal, and the detection module 510 may cause the processor 502 to detect a change in the characteristic between a first point in time and a second point in time. The wireless signal may include data from a remote source. For example, the remote source may have encoded or modulated the wireless signal to include the data.

The computer-readable medium 500 may include a proximity determination module 520. The proximity determination module 520 may cause the processor 502 to determine whether an object is within a proximity threshold of a user based on the change in the wireless signal. For example, the proximity determination module 520 may cause the processor 502 to determine whether a change in the characteristic related to the path of the wireless signal is indicative of an object being within the proximity threshold of the user. The proximity determination module 520 may cause the processor 502 to determine whether a change in the path of the wireless signal resulted from the object being within the proximity threshold of the user The computer-readable medium 500 may include an indication module 530. The indication module 530 may cause the processor 502 to indicate to the user that the object is within the proximity threshold of the user. For example, the indication module 530 may cause the processor 502 to cause an output device, such as a display, speaker, haptic motor, etc., to indicate to the user that the object is within the proximity threshold of the user. The indication module 530 may cause the processor 502 to cause the output device to provide a message that the object is within the proximity threshold of the user, provide a symbolic indication that the object is within the proximity threshold of the user, or the like. In an example, when executed by the processor 502, the detection module 510 may realize the analysis engine 220 of FIG. 2 or the monitoring engine 310 of FIG. 3; the proximity determination module 520 may realize the analysis engine 220 or the analysis engine 320; and the indication module 530 may realize the user interface engine 230 or the indication engine 330.

Figure 6:
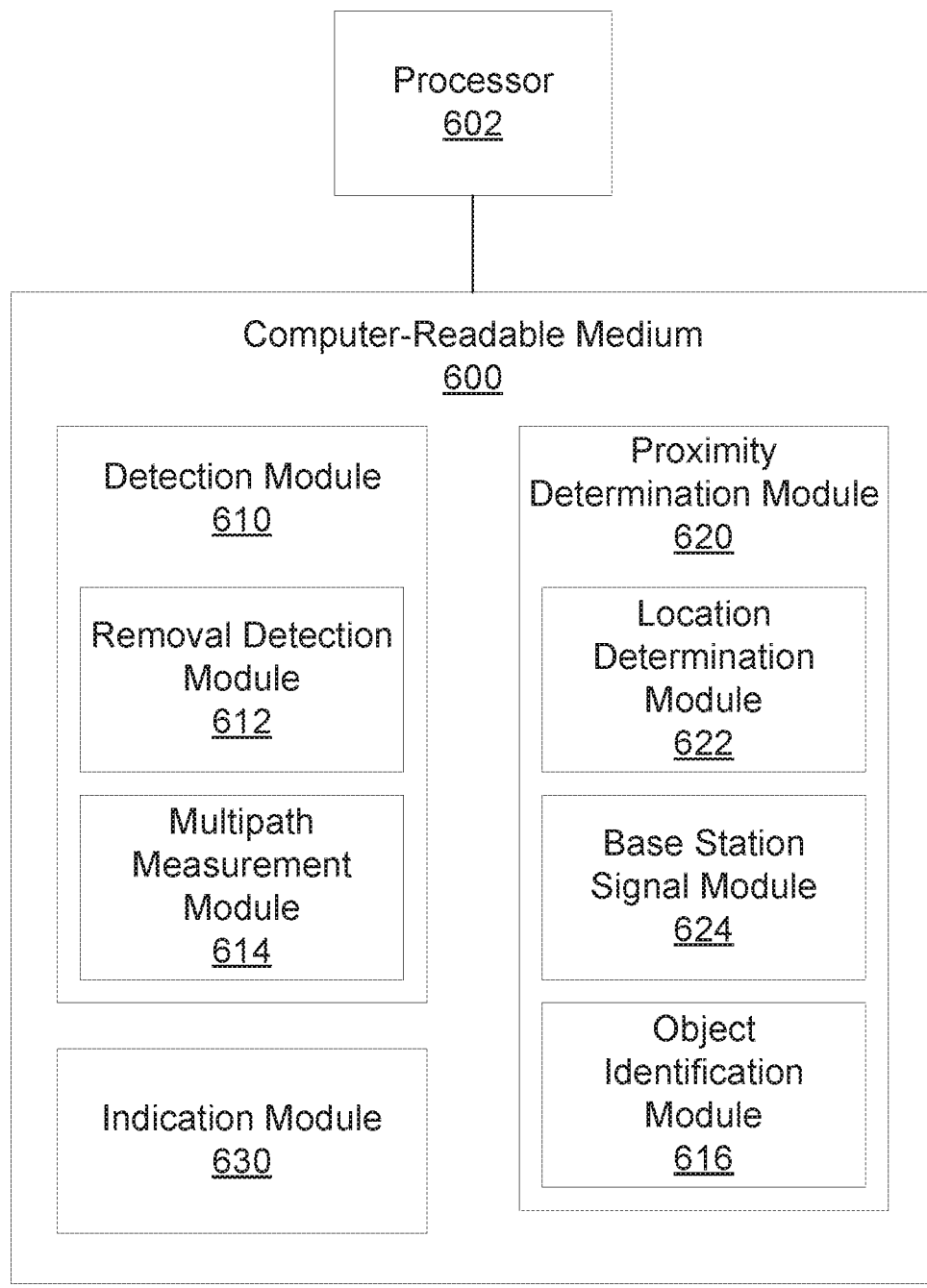
FIG. 6 is a block diagram of another example computer-readable medium including instructions that cause a processor to detect objects within a proximity threshold of a user.

FIG. 6 is a block diagram of another example computer-readable medium 600 including instructions that, when executed by a processor 602, cause the processor 602 to detect objects within a proximity threshold of a user. The computer-readable medium 600 may include a detection module 610. The detection module 610 may cause the processor 602 to detect a change over time in a wireless signal related to a path of the wireless signal. The wireless signal may include data from a remote source. In an example, the detection module 610 may include a removal detection module 612. The removal detection module 612 may cause the processor 602 to detect removal of an obstacle from the path of the wireless signal, and the wireless signal may have been received from the object. For example, the removal detection module 612 may cause the processor 602 to detect a rapid change in signal strength corresponding to a sudden removal of the obstacle. The obstacle may have been removed due to movement of the obstacle or movement of the object.

In some examples, the detection module 610 may include a multipath measurement module 614. The multipath measurement module 614 may cause the processor 602 to determine a characteristic of the wireless signal related to multipath propagation of the wireless signal. For example, the multipath measurement module 614 may cause the processor 602 to determine parameters of an adaptive equalizer. For example, the multipath measurement module 614 may cause the processor 602 to receive the parameters of the adaptive equalizer from the adaptive equalizer. The multipath measurement module 614 may cause the processor 602 to compare the parameters to previous parameters for the adaptive equalizer.

The computer-readable medium 600 may include a proximity determination module 620. The proximity determination module 620 may cause the processor 602 to determine whether an object is within a proximity threshold of a user based on the change in the wireless signal. For example, the detection module 610 may cause the processor 602 to make measurements of a change in the signal strength, the multipath characteristic, or the like available to the proximity determination module 620. The proximity determination module 620 may cause the processor 602 to determine whether the change is indicative of the object being within the proximity threshold of the user. The proximity determination module 620 may cause the processor 602 to determine whether the object is within a predetermined distance of the user, in the same room as the user, or the like. For example, the proximity determination module 620 may cause the processor 602 to determine whether the object is no longer separated from the user by the wall, determine whether the distance from the object was less than a threshold, or the like.

In an example, the proximity determination module 620 may include a location determination module 622. The location determination module 622 may cause the processor 602 to determine a location of the object based on the path of the wireless signal. For example, the location determination module 622 may cause the processor 602 to determine a direction of the object, a distance of the object, or the like. The location determination module 622 may cause the processor 602 to determine the location of the object based on a signal strength of the wireless signal, a multipath characteristic of the wireless signal (e.g., a magnitude or an index, time, or position of a parameter of an adaptive equalizer), or the like. In an example, the location determination module 622 may cause the processor 602 to determine the delay of the path reflecting off the object relative to a line-of-sight path based on the index, time, or position of the parameter of the adaptive equalizer.

The proximity determination module 620 may include a base station signal module 624. The base station signal module 624 may cause the processor 602 to communicate with a base station. For example, the base station signal module 624 may cause the processor 602 to receive measurements by the base station of a characteristic of a wireless signal received by the base station. The base station signal module 624 may cause the processor 602 to determine whether the object is within the proximity threshold of the user based on the change in the wireless signal detected by the detection module 610 and a change in the wireless signal received by the base station related to a path of the wireless signal received by the base station. For example, the base station signal module 624 may cause the processor 602 to determine whether the object is within the proximity threshold of the user based on a change in signal strength, a change in a multipath characteristic, or the like for the wireless signal received by the base station. The base station signal module 624 may cause the processor 602 to receive parameters of an adaptive equalizer in the base station. The wireless signal received by the base station may be the same as or different from the wireless signal detected by the detection module 610.

The proximity determination module 620 may include an object identification module 626. The object identification module 626 may cause the processor 602 to identify the object based on the wireless signal. In an example, the wireless signal may be received from the object. For example, the wireless signal may be received by a device carried by the object. The wireless signal from the object may include a unique identifier. The object identification module 626 may cause the processor 602 to identify the object based on the unique identifier. For example, the object identification module 626 may cause the processor 602 to access a lookup table that associates unique identifiers to user recognizable names. The object identification module 626 may cause the processor 602 to receive a user recognizable name from the user when a unique identifier is not associated with a user recognizable name.

The computer-readable medium 600 may include an indication module 630. The indication module 630 may cause the processor 602 to indicate to the user that the object is within the proximity threshold of the user. For example, the indication module 630 may display an indication the object is within the proximity threshold of the user, play a sound indicating the object is within the proximity threshold of the user, provide haptic feedback indicating the object is within the proximity threshold of the user, or the like. In some examples, the indication module 630 may cause the processor 602 to indicate the location of the object determined by the location determination module 622 to the user. For example, the indication module 630 may cause the processor 602 to cause displaying of an image indicative of the location (e.g., a map or map-like image of an absolute or relative location), displaying of text describing the location, playing of speech describing the location, playing of a sound that appears to originate from the location, or the like. In some examples, the indication module 630 may cause the processor 602 to indicate the identity of the object determined by the object identification module 626 to the user. For example, the indication module 630 may cause the processor 602 to cause displaying of an image of the object, displaying of text describing the identity of the object, playing of speech describing the identity of the object, playing of a sound recorded from the object, playing of speech imitating speech from the object, or the like. In an example, when executed by the processor 602, the detection module 610, the removal detection module 612, or the multipath measurement module 614 may realize the analysis engine 220 of FIG. 2 or the monitoring engine 410 of FIG. 4; the proximity determination module 620, the location determination module 622, the base station signal module 624, or the object identification module 626 may realize the analysis engine 220 or the analysis engine 420; and the indication module 630 may realize the user interface engine 230 or the indication engine 430.

The above description is illustrative of various principles and implementations of the present disclosure. Numerous variations and modifications to the examples described herein are envisioned. Accordingly, the scope of the present application should be determined only by the following claims.

What is claimed is:

1. A virtual reality headset comprising:
a wireless communication engine to receive a wireless signal that includes data from a remote source; and
an analysis engine to:
detect a change over time in the wireless signal related to a path of the wireless signal, and
determine whether an object is within a proximity threshold of a user based on the change in the wireless signal,
wherein the analysis engine is to detect a change in a multipath characteristic of the wireless signal and determine whether the object is within the proximity threshold of the user based on the multipath characteristic.

2. The virtual reality headset of claim 1, wherein the object comprises an animal.

3. The virtual reality headset of claim 1, wherein the analysis engine is to identify the object and determine whether to notify the user based on the identity of the object.

4. The virtual reality headset of claim 3, further comprising a user interface engine to indicate to the user that the object is within the proximity threshold of the user and to indicate an identity of the object.

5. A device comprising:
a monitoring engine to measure a characteristic of a wireless signal related to a path of the wireless signal, wherein the wireless signal includes data from a remote source;

an analysis engine to determine that an object is within a proximity threshold of a user based on the characteristic of the wireless signal; and an indication engine to indicate to the user that the object is within the proximity threshold of the user, wherein the analysis engine is to determine that the object is a potential threat, and wherein the indication engine is to indicate that the object is within the proximity threshold based on the determination that the object is the potential threat.

6. The device of claim 5, wherein the analysis engine is to determine that the object is the potential threat based on a criterion selected from the group consisting of a proximity of the object, an identity of the object, and a time within the proximity threshold of the user.

7. The device of claim 5, wherein the indication engine is to request that the user identify the object.

8. The device of claim 5, further comprising a communication engine communicatively coupled to a remotely located base station, wherein the analysis engine is to determine a location of the object relative to the user based on the characteristic of the wireless signal and a measurement of a wireless signal received by the remotely located base station.

9. A non-transitory computer-readable medium comprising instructions that, when executed by a processor, cause the processor to:

detect a change over time in a wireless signal related to a path of the wireless signal, wherein the wireless signal includes data from a remote source;

determine whether an object is within a proximity threshold of a user based on the change in the wireless signal; and indicate to the user that the object is within the proximity threshold of the user, wherein the instructions cause the processor to detect the change in the wireless signal by detecting removal of an obstacle from the path of the wireless signal, and wherein the wireless signal is received from the object.

10. The computer-readable medium of claim 9, wherein the instructions cause the processor to determine a location of the object based on the path of the wireless signal and indicate the location to the user.

11. The computer-readable medium of claim 9, wherein the instructions cause the processor to communicate with a base station, and determine whether the object is within the proximity threshold of the user based on the change in the wireless signal and a change in a wireless signal received by the base station related to a path of the wireless signal received by the based station.

12. The computer-readable medium of claim 9, wherein the instructions cause the processor to identify the object based on the wireless signal and indicate the identity to the user, and wherein the wireless signal is received from the object.

* * * * *